United States Patent
Jing et al.

(10) Patent No.: US 10,281,604 B2
(45) Date of Patent: May 7, 2019

(54) METHOD OF REMOVING NOISE IN SEISMIC REVERSE-TIME MIGRATION

(71) Applicants: Charlie Jing, Spring, TX (US); John E. Anderson, Spring, TX (US)

(72) Inventors: Charlie Jing, Spring, TX (US); John E. Anderson, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 241 days.

(21) Appl. No.: 15/068,977

(22) Filed: Mar. 14, 2016

(65) Prior Publication Data

US 2016/0341837 A1 Nov. 24, 2016

Related U.S. Application Data

(60) Provisional application No. 62/164,324, filed on May 20, 2015.

(51) Int. Cl.
*G01V 1/30* (2006.01)
*G01V 1/36* (2006.01)

(52) U.S. Cl.
CPC ............. *G01V 1/364* (2013.01); *G01V 1/301* (2013.01); *G01V 2210/324* (2013.01); *G01V 2210/51* (2013.01); *G01V 2210/522* (2013.01); *G01V 2210/679* (2013.01)

(58) Field of Classification Search
CPC combination set(s) only.
See application file for complete search history.

(56) References Cited

U.S. PATENT DOCUMENTS

| | | | |
|---|---|---|---|
| 2011/0276272 A1* | 11/2011 | Artman | G01V 1/282 702/16 |
| 2011/0286305 A1* | 11/2011 | Artman | G01V 1/282 367/38 |
| 2014/0114578 A1* | 4/2014 | Sallas | G06F 17/00 702/17 |
| 2015/0124559 A1* | 5/2015 | Cha | G01V 1/362 367/7 |
| 2016/0320512 A1* | 11/2016 | Zhao | G01V 1/282 |

OTHER PUBLICATIONS

Depth imaging using Reverse Time Migration, May 1, 2013.*
Dogma, Haub, et al., (2010), "On the Connection Between Artifact Filtering in Reverse-Time Migration and Adjoint Tomography", Geophysics, vol. 75, No. 6, pp. S219-S223.
Fletcher, R.P., et al., (2006), "Suppressing Unwanted Internal Reflections In Prestack Reverse-Time Migration", Geophysics, vol. 71, No. 6, pp. E79-E82.
Zhang, Y., et al., (2009) "Practical Issues In Reverse Time Migration: Tru Amplitude Gathers, Noise Removal and Harmonic Source Encoding", First Break, vol. 26, pp. 29-35.
Yoon, K., et al., (2004), "Challenges In Reverse-Time Migration", 74th Annual International Meeting, SEG, 4 pages.

* cited by examiner

*Primary Examiner* — Mamadou L Diallo
(74) *Attorney, Agent, or Firm* — ExxonMobil Upstream Research Company Law Department

(57) ABSTRACT

A method, including: obtaining, with a processor, a seismic image of a subsurface region from a computer memory; predicting, with a processor, a dip of the seismic image of the subsurface region; and removing, with a processor, noise or artifacts from the seismic image of the subsurface region by applying a dip guided Laplacian filter, wherein the removing generates another seismic image of the subsurface region that has noise or artifacts removed relative to the seismic image of the subsurface region.

11 Claims, 4 Drawing Sheets

METHOD OF REMOVING NOISE IN SEISMIC REVERSE-TIME MIGRATION

CROSS-REFERENCE TO RELATED APPLICATION

This application claims the benefit of U.S. Provisional Patent Application 62/164,324 filed May 20, 2015 entitled METHOD OF REMOVING NOISE IN SEISMIC REVERSE-TIME MIGRATION, the entirety of which is incorporated by reference herein.

FIELD OF THE INVENTION

The present technological advancement generally relates to the field of geophysical prospecting and, more particularly, a seismic image noise filtering technique applied to images from wave-equation migration, such as reverse-time migration.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Imaging techniques based on wave equations, such as Reverse-Time Migration (RTM), have been widely applied to image the subsurface for hydrocarbon exploration. RTM is a very high fidelity imaging method which is commonly applied in complex geology settings. It is also an expensive algorithm. Furthermore, the traditional RTM image suffers from low-wavenumber noise created by backscattering energy from high-contrast boundaries in the models used by the imaging algorithm (Yoon et al., 2004; Fletcher et al., 2006; Sun et al., 2009; Douma et al., 2010). Various techniques have been tried to reduce and/or filter out the low-wavenumber noise with some level of success. These techniques range from modifications to the RTM imaging condition (Yoon et al., 2004; Douma et al., 2010), modification to the wave propagation equation to reduce the reflection from contrast boundaries in the imaging model (Fletcher et al., 2006), to the application of traditional Laplacian filter to RTM raw images (Sun and Zhang, 2009).

Different techniques have different computational intensity requirements and different effectiveness in removing the low-wavenumber noise. Techniques involving the application of different imaging conditions (Yoon et al., 2004; Douma et al., 2010) other than the direct zero-lag convolution of source and receiver wave fields or the generation of image angle gathers tend to increase the computational cost substantially.

Techniques in this category usually involve the calculation of wave propagation direction, which is an expensive operation. Also, the calculation of wave propagation direction in a complex geological area tends to have large error in the calculated wave propagation direction. This might cause leakage of the low-wavenumber noise in the image.

In practical applications, the traditional Laplacian filter technique (Sun and Zhang, 2009) is quite effective and computationally efficient. This is a post-imaging filter technique. There is no need to modify the imaging kernel, and thus the traditional efficient image condition of direct cross correlation of source and receiver wave field can be used. The filter is traditionally applied to the raw stacked image to filter out the low-wavenumber noise. Thus, it is computationally efficient. However, the traditional Laplacian filter operator is image dip independent, or isotropic. The low-wavenumber noise and other coherent noises from migration do show some directional characteristics. Despite its high efficiency, it still cannot provide a satisfactory clean image under many situations.

SUMMARY

A method, including: obtaining, with a processor, a seismic image of a subsurface region from a computer memory; predicting, with a processor, a dip of the seismic image of the subsurface region; and removing, with a processor, noise or artifacts from the seismic image of the subsurface region by applying a dip-guided Laplacian filter, wherein the removing generates another seismic image of the subsurface region that has noise or artifacts removed relative to the seismic image of the subsurface region.

In the method, the applying can include applying the dip-guided Laplacian filter along a normal direction of the seismic image of the subsurface region.

In the method, the obtaining can further include: dividing RTM input seismic data by frequency squared; performing reverse-time migration by using source and receiving wave field cross-correlation imaging condition; and generating the seismic image of the subsurface region.

In the method, the removing can include using a mixed image-dip-guided Laplacian filter, which includes a weighted combination of a Laplacian filter and an image-dip-guided Laplacian filter.

In the method, the mixed image-dip-guided Laplacian filter can include a non-zero weighting parameter.

In the method, the weighting parameter can have a value in a range of 0.1 to 0.5.

In the method, the weighting parameter can have a value greater than zero and less than or equal to one.

In the method, the weighting parameter can be spatially dependent.

In the method, the weighting parameter can be only depth dependent.

In the method, the removing can include applying the mixed dip-guided Laplacian filter multiple times, each with different values for the weighting parameter.

In the method, the predicting can include predicting image dip, partially or fully, by using a filtered image obtained in a previous iteration of the removing.

In the method, the predicting can include predicting the dip of the seismic image of the subsurface region from the seismic image of the subsurface region or from prior dip knowledge in the subsurface region, or a combination of both.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Figure 1A:
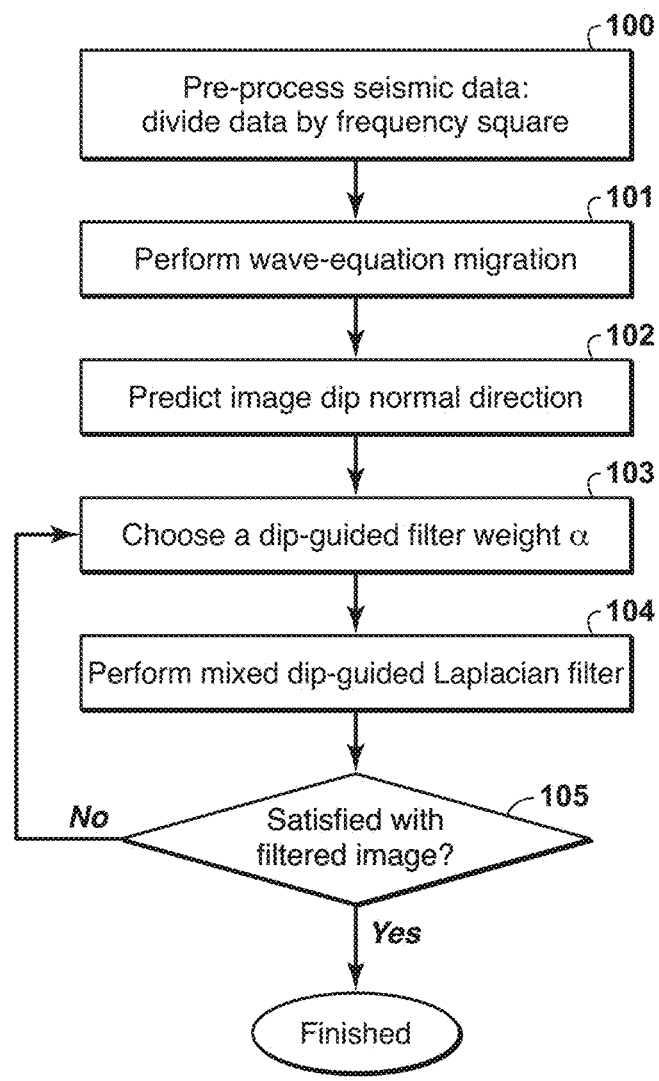
FIG. 1A is a flow chart showing exemplary steps for removing noise from seismic images from reverse-time migration.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present technological advancement. Moreover, certain dimensions may be exaggerated to help visually convey such principles.

Exemplary methods described herein remove or filter noise from seismic images obtained from a wave-equation imaging technique, such as RTM. The exemplary methods described herein can provide an efficient and more effective post-imaging noise filtering technique than conventional techniques. A non-limiting embodiment of the present technological advancement combines the efficient post-imaging filter technique and image dip information to obtain a much cleaner filtered image. For example, such a non-limiting embodiment combines the efficient post-imaging Laplacian-like filter with image dip information derived either from the image itself or from known geology dip information, such as known horizons or geo-body boundaries, to achieve a more effective noise removing effect.

It is more effective to remove the noise by applying a Laplacian-like operator along the image normal direction. A Laplacian-like filter operator along the image normal direction has been derived based on the predicted dip information. Hereinafter, this filter is referred to as an image-dip-guided Laplacian filter. However, the present technological advancement can be utilized while applying a Laplacian-like operator along other image directions.

To prevent the loss of weak signals, a mixed filter operator is designed to be the combination of the traditional Laplacian operator filter and the image-dip-guided Laplacian filter derived below. A non-zero weight factor is applied to the image-dip-guided Laplacian filter operator to control the amount of contribution from it in the mixed filter operator. This mixed filter is hereinafter referred to as a mixed image-dip-guided Laplacian filter.

Similar to the conventional Laplacian filter method, the input seismic data to the imaging program should be pre-processed to integrate twice in time or divide by frequency square in the frequency domain to compensate for the impact of the filter on the final image spectrum.

Use of the mixed image-dip-guided filter to remove noise from a raw RTM image can obtain a better filtered RTM image and provide improved computational efficiency of the image filter technique compared to other techniques by either using modified RTM imaging conditions or modified wave propagation equations. As has been recognized previously, traditional RTM images suffer from low-wavenumber noise generated by backscattering energy from high-contrast boundaries in the models used by the imaging algorithm (Yoon et al., 2004; Fletcher et al., 2006; Sun et al., 2009; Douma et al., 2010). The traditional Laplacian filter operator (Sun and Zhang, 2009) has worked reasonably well in removing the low-wavenumber noise in some cases.

A conventional Laplacian filter operator applied to the RTM image, I(x,y,z), is given by, $$\bar{I}(x, y, z) = V^2(x, y, z)\left(\frac{\partial^2}{\partial^2 x} + \frac{\partial^2}{\partial^2 y} + \frac{\partial^2}{\partial^2 z}\right)I(x, y, z), \quad (1)$$

where V(x,y,z) is the imaging velocity, and (x,y,z) are the spatial Cartesian coordinates in three-dimensional space, or (x,z) in two-dimensional space, and $\bar{I}$(x,y,z) is the filtered image. This conventional Laplacian filter operator is image dip independent, or isotropic. However, the low-wavenumber noise and other coherent noises from migration do show some directional characteristics. This conventional Laplacian filter cannot provide a clean filtered image in lots of cases.

It has been determined that is more effective to remove the noise from an RTM image by applying a Laplacian-like operator along the image normal direction. In an exemplary embodiment of the present technological advancement, instead of using the traditional filter in equation (1), the traditional Laplacian operator is replaced by an one dimensional Laplacian operator along the image dip direction as below, $$\bar{I}_{dg}(x, y, z) = V^2(x, y, z)\frac{\partial^2 I(x, y, z)}{\partial^2 r_k}, \quad (2)$$

where $\vec{r}_k = r_k\vec{K}$, and $\vec{K}$ =[Kx,Ky,Kz], which is the unit vector along the local image normal dip direction, and $\bar{I}_{dg}$(x,y,z) is the image filtered by the dip-guided Laplacian filter. After ignoring the spatial variation of the image dip and some algebra, the image-dip-guided Laplacian filter of eq. (2) is given by, $$\bar{I}_{dg}(x, y, z) = V^2(x, y, z)\left(K_x^2\frac{\partial^2}{\partial^2 x} + K_y^2\frac{\partial^2}{\partial^2 y} + K_z^2\frac{\partial^2}{\partial^2 z}\right)I(x, y, z). \quad (3)$$

The image normal dip vector can be obtained by any dip estimation method, such as gradient structure tensor method and discrete scan method as discussed by Marfurt, (Marfurt, 2006). Mathematically, the unit dip normal vector can be predicted from the image as, $$\vec{K} = \frac{\nabla I(x, y, z)}{|\nabla I(x, y, z)|}, \text{ and} \quad (4)$$

-continued $$\nabla I(x, y, z) = \left[ \frac{\partial I(x, y, z)}{\partial x}, \frac{\partial I(x, y, z)}{\partial y}, \frac{\partial I(x, y, z)}{\partial z} \right]. \quad (5)$$

The dip may also be predicted from the filtered image $\overline{I_{dg}}$ by using eqs. (3), (4), and (5) in an iterative fashion. Optionally, the dip field can be smoothed locally over space. The dip can also be obtained fully or partially in space from prior geological knowledge about the subsurface model if available, such as known horizons or geo-body boundaries in the image model. The image dip prediction from an image can also be based on the filtered image instead of the original raw image, replacing the original image I in equations (4) and (5) by filtered image $\overline{I_{dg}}$ or $\overline{I}$. This makes the image filter an iterative process.

The image-dip-guided Laplacian filter of equation (3) can not only enhance the effectiveness of the traditional low-wavenumber noise filtering, but also enhance any stronger events in the image and reduce other weak events, such as weak migration swings. However, this image-dip-guided Laplacian filter could potentially filter out weak signals if the predicted dip is not that of the signal that needs to be preserved. To reduce this potential risk of filtering out a weak signal and to achieve a cleaner image, a mixed image-dip-guided Laplacian filter can been designed by combining the traditional Laplacian filter of equation (1) and the image-dip-guided Laplacian filter of equation (3), which is given by $$\overline{I_{mix}}(x, y, z) = V^2(x, y, z) \left( w_x \frac{\partial^2}{\partial^2 x} + w_y \frac{\partial^2}{\partial^2 y} + w_z \frac{\partial^2}{\partial^2 z} \right) I(x, y, z). \quad (6)$$

The three coefficients at front of the three second-order differential operators are given by $$w_x = \alpha K_x^2 + \frac{1-a}{3}; \quad (7)$$
$$w_y = \alpha K_y^2 + \frac{1-a}{3};$$
$$w_z = \alpha K_z^2 + \frac{1-a}{3},$$

where [Kx,Ky,Kz] is the dip normal unit vector, a represents the weight of the dip-guided Laplacian filter of equation (3) in the mixed filter of equation (6) and its value is between 0 and 1. The sum of the three coefficients, $w_x$, $w_y$, and $w_z$, is automatically normalized to one, namely, $w_x+w_y+w_z=K_x^2+K_y^2+K_z^2=1$.

When $\alpha=1$, we have $w_x=K_x^2$, $w_y=K_y^2$, $w_z=K_z^2$. Equation (6) becomes the same as the full dip-guided Laplacian filter of equation (3).

When $\alpha=0$, we have $w_x=w_y=w_z=\frac{1}{3}$. Equation (6) reduces to the traditional full Laplacian filter of equation (1).

In general, the traditional full Laplacian filter, or $\alpha=0$ in equations (6) and (7), does not bias any particular dip in filter operation due to its isotropic characteristics. It has less risk of filtering out any particular dipping event. However, the filtered image usually still contains undesired noise including the low-wavenumber noise and other migration artifacts. The pure dip-guided filter, or $\alpha=1$ in equations (6) and (7), can provide a much cleaner filtered image. However, it has an elevated risk of filtering out a weak but desired signal.

The weighting parameter $\alpha$ can be adjusted to achieve the balance between the noise level left in the filtered image and the preservation of weak signal.

This mixed image-dip-guided Laplacian filter is computationally efficient. One can apply this filter multiple times by using different weighting parameter $\alpha$ and selecting the one which generates a satisfactory filtered image to user. Depending on the noise level and the extent of existing crossing-dip (or conflicting dip, multiple events of different dips cross in space) events in the original image, one can adjust the weighting parameter $\alpha$ accordingly. The higher the noise level (both coherent and non-coherent) is, the lower the weighting parameter $\alpha$ should be, and the higher the extent of existing crossing-dip events is, the lower the weighting parameter $\alpha$ should be in order to get an overall better filtered image with the preservation of weak and/or conflicting dip events. It has been found that $\alpha$ in the range of 0.1 to 0.5 tends to generate satisfactory results in most practical applications.

In practical applications, $\alpha$ can also be spatial dependent to achieve an optimal result in the whole image space. One simple example is to make $\alpha$ to be depth dependent only. In most cases, the low-wavenumber noise exists above some high-contrast boundary in the imaging model. One can set $\alpha$ to a higher value in the depth range above the high-contrast boundary of strong noise, to a lower value in the depth range below the high-contrast boundary of a lower noise level, and make $\alpha$ change smoothly from a value in one depth range to a value in another depth range.

The filter operator shown by equations (6) and (7) is a second-order differential operator with respect to space, which is similar to the traditional Laplacian filter. The input seismic data to RTM should be processed by dividing the seismic data by frequency square in frequency domain, or any other method which generate the same effect, to compensate for the frequency spectra change caused by the Laplacian filter. This will preserve the frequency spectrum of the final image. The factor of imaging velocity square in equation (6) is applied to preserve the image amplitude. This factor can be ignored if this image amplitude compensation is not desired.

FIG. 1A illustrates an exemplary method of the present technological advancement. Step 100 includes dividing the RTM input seismic data by frequency square, or any other equivalent operation. Step 101 includes performing RTM by using the traditional source and receiver wave field cross-correlation imaging condition and generating a raw stack image. Step 102 includes predicting the image dip; any prior knowledge about the subsurface dip can be integrated in this dip prediction step. The image dip may also be predicted from the filtered image in an iterative way. Step 103 includes selecting a dip-guided filter weight $\alpha$. Step 104 includes applying the mixed dip-guided Laplacian filter to the raw stack image. Step 105 includes determining whether the filtered image is satisfactory; if yes, the filtering process is done; if not, the process returns to step 103 to select another weighting factor value.

Figure 1B:
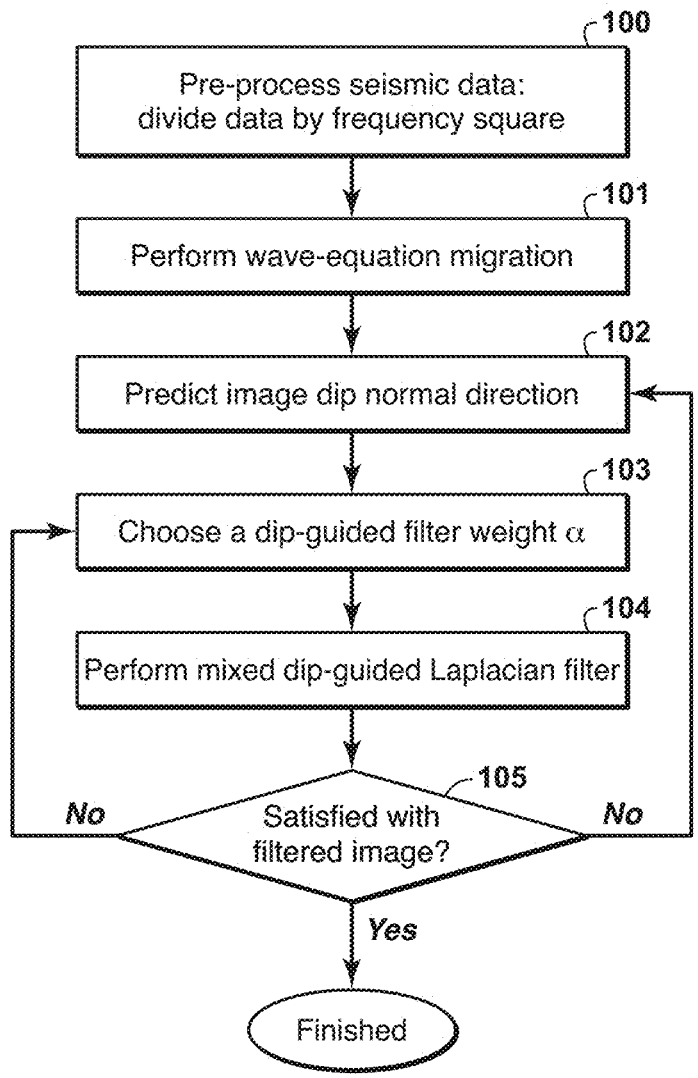
FIG. 1B is a flow chart showing exemplary steps of predicting the image dip by using the filtered image.

FIG. 1B illustrates an exemplary method of the present technological advancement where predicting the image dip is accomplished by using the filtered. Image. The steps in FIG. 1B are similar to those of FIG. 1A, except the process can go back to the image dip prediction step 102 from step 105 and use the filtered image from step 104 in the dip prediction of step 102.

Figure 2:
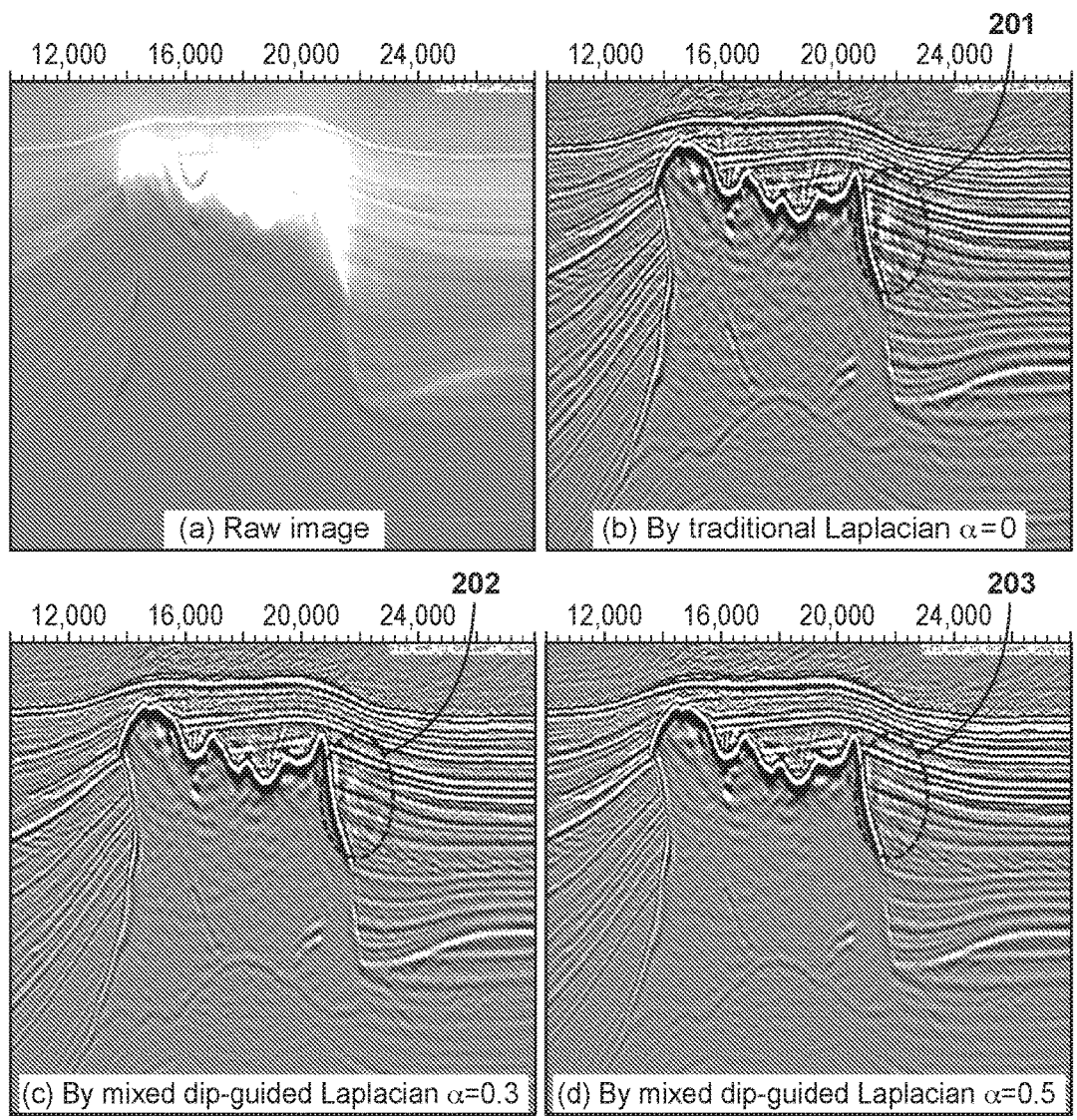
FIG. 2 is an example of seismic RTM raw stacked image and filtered images: (a) raw stacked image before filter; (b) filtered image by traditional Laplacian filter; (c) filtered image by the present technological advancement with dip-guided weight α=0.3; and (d) filtered image by the present technological advancement with dip-guided weight α=0.5.

FIG. 2 illustrates an example of the present technological advancement applied to a seismic RTM raw stacked image. On the original raw stacked image shown in FIG. 2 (*a*), the white cloud 200 at the center shallow part is the so-called low-frequency noise. This type of noise exists at other parts of the image, but with much weaker amplitude. The filtered image by traditional Laplacian filter is show in FIG. 2 (b). The filtered images by the method of the present technological advancement with dip-guided weight α=0.3 and α=0.5 are shown in FIGS. 2(c) and (d), respectively. Comparing image 2(d) to image 2(b), one can see that the method of present technological advancement is more effective not only in removing the low-wavenumber noise (see noise inside the ellipses 201, 202, and 203), but also in removing the very large dip weak migration artifacts (nearly vertical weak events).

Figure 3:
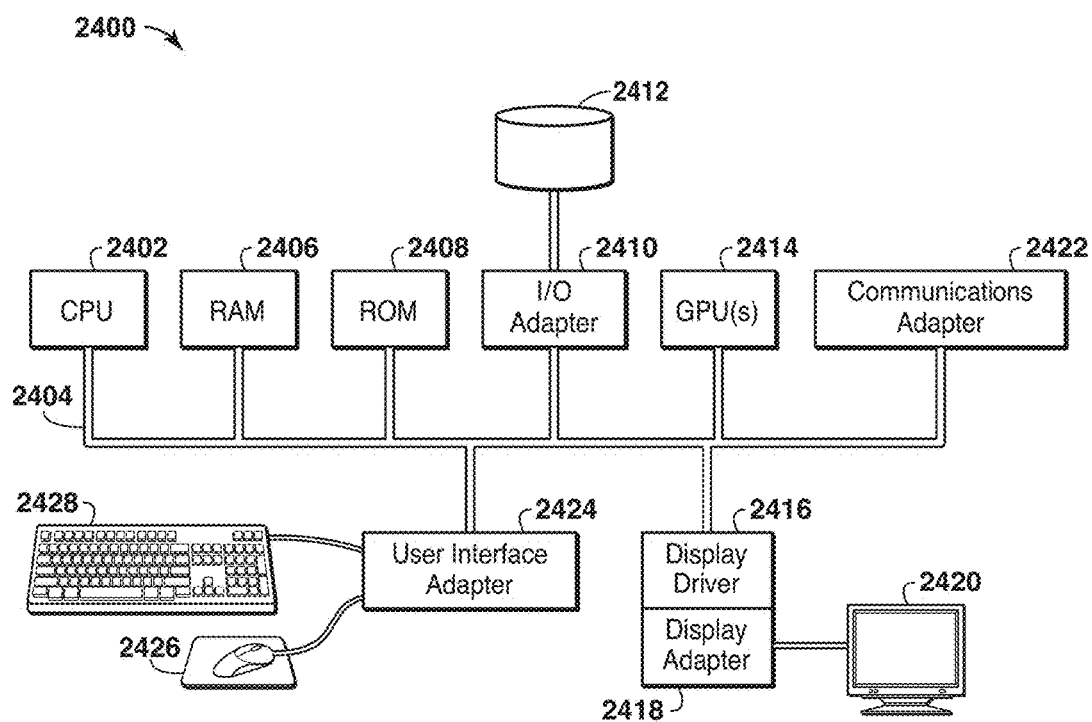
FIG. 3 is an exemplary computer system useable with the present technological advancement.

FIG. 3 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 3, additional CPUs may be present. Moreover, the computer system 2400 may comprise a networked, multi-processor computer system that may include a hybrid parallel CPU/GPU system. The CPU 2402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, GPU(s) 2414, a communications adapter 2422, a user interface adapter 2424, a display driver 2416, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 2400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The foregoing description is directed to particular example embodiments of the present technological advancement. It will be apparent, however, to one skilled in the art, that many modifications and variations to the embodiments described herein are possible. All such modifications and variations are intended to be within the scope of the present invention, as defined in the appended claims. As will be obvious to the reader who works in the technical field, the present technological advancement is intended to be fully automated, or almost fully automated, using a computer programmed in accordance with the disclosures herein.

The following references are hereby incorporated by reference in their entirety:

Huub Douma, David Yingst, Ivan Vasconcelos, and Jeroen Tromp, "On the connection between artifact filtering in reverse-time migration and adjoint tomography", Geophysics Vol 75, NO. 6, P. S219-S223 (2010);

Robin P. Fletcher, Paul J. Fowler, Phil Kitchenside, and Uwe Albertin, "Suppressing unwanted internal reflections in prestack reverse-time migration", Geophysics Vol 71, NO. 6, P. E79-E82 (2006);

Kurt J. Marfurt, "Robust estimates of 3D reflector dip and azimuth", Geophysics Vol 71, NO. 4, P P29-P40 (2006).

James Sun, Yu Zhang, "Practical issues of reverse time migration: true-amplitude gathers, noise removal and harmonic-source encoding", ASEG Expanded Abstracts 2009 (Australian Society of Exploration Geophysicists): 20$^{th}$ Geophysical Conference; and K. Yoon, K. Marfurt, and W. Starr, "Challenges in reverse-time migration": 74$^{th}$ Annual International Meeting, SEG, Expanded Abstracts, P. 1057-1060 (2004).

The invention claimed is:

1. A method, comprising:
   obtaining, with a processor, a stacked seismic image of a subsurface region from a computer memory;
   predicting, with a processor, a dip of the stacked seismic image of the subsurface region; and
   removing, with a processor, noise or artifacts from the stacked seismic image of the subsurface region by applying an image-dip-guided Laplacian filter along a normal direction of the stacked seismic image of the subsurface region, and
   generating another stacked seismic image of the subsurface region that has noise or artifacts removed relative to the stacked seismic image of the subsurface region.

2. The method of claim 1, wherein the obtaining further comprises:
   dividing RTM input seismic data by frequency squared;
   performing reverse-time migration by using source and receiving wave field cross-correlation imaging condition; and
   generating the stacked seismic image of the subsurface region.

3. The method of claim 1, wherein the removing includes using a mixed image-dip-guided Laplacian filter, which includes a weighted combination of a Laplacian filter and an image-dip-guided Laplacian filter.

4. The method of claim 3, wherein the mixed image-dip-guided Laplacian filter includes a non-zero weighting parameter.

5. The method of claim 4, wherein the weighting parameter has a value in a range of 0.1 to 0.5.

6. The method of claim 4, wherein the weighting parameter has value greater than zero and less than or equal to one.

7. The method of claim 3, wherein the weighting parameter is spatially dependent.

8. The method of claim 7, wherein the weighting parameter is only depth dependent.

9. The method of claim 3, wherein the removing includes applying the mixed image-dip-guided Laplacian filter multiple times, each with different values for the weighting parameter.

10. The method of claim 9, wherein the predicting includes predicting image dip, partially or fully, by using a filtered image obtained in a previous iteration of the removing.

11. The method of claim 1, wherein the predicting includes predicting the dip of the stacked seismic image of the subsurface region from the stacked seismic image of the subsurface region or from prior dip knowledge in the subsurface region, or a combination of both.

* * * * *